E. THOMSON.
ELECTRIC HEATER.
APPLICATION FILED MAR. 18, 1909.
1,008,622.
Patented Nov. 14, 1911.
2 SHEETS—SHEET 2.
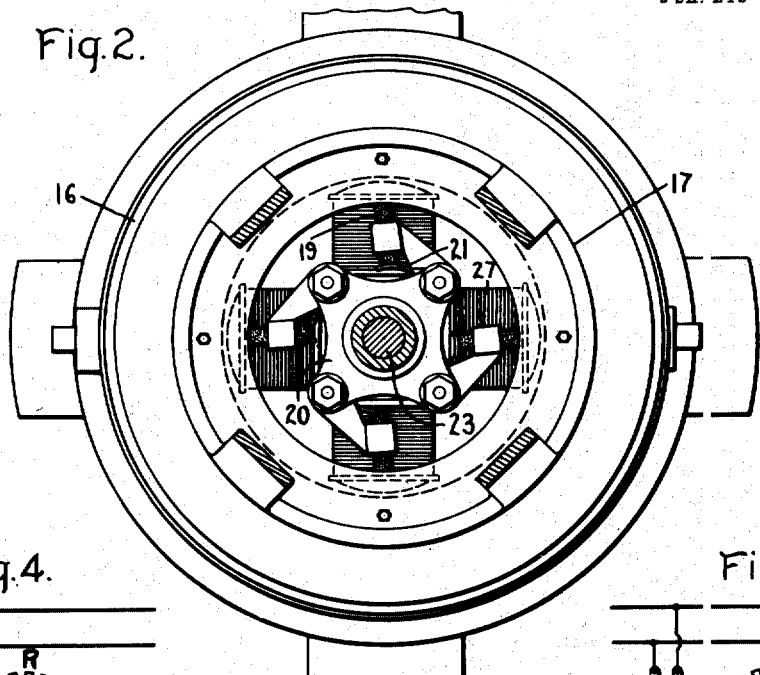
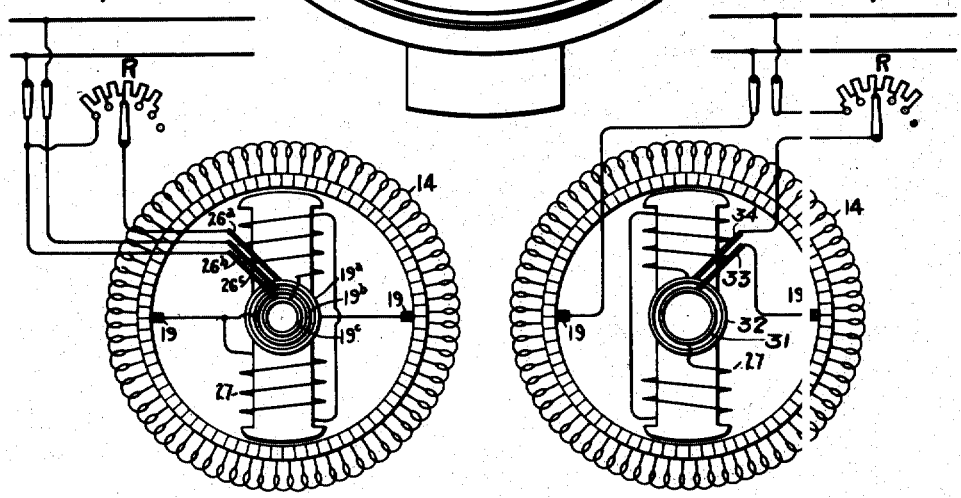
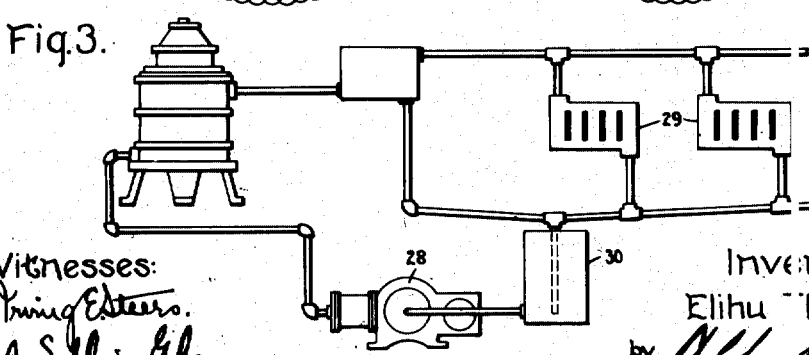
Witnesses:
Irving Esters.
J. Ellis Glenn.
Inventor
Elihu Thomson,
by Alexander
Att'y.

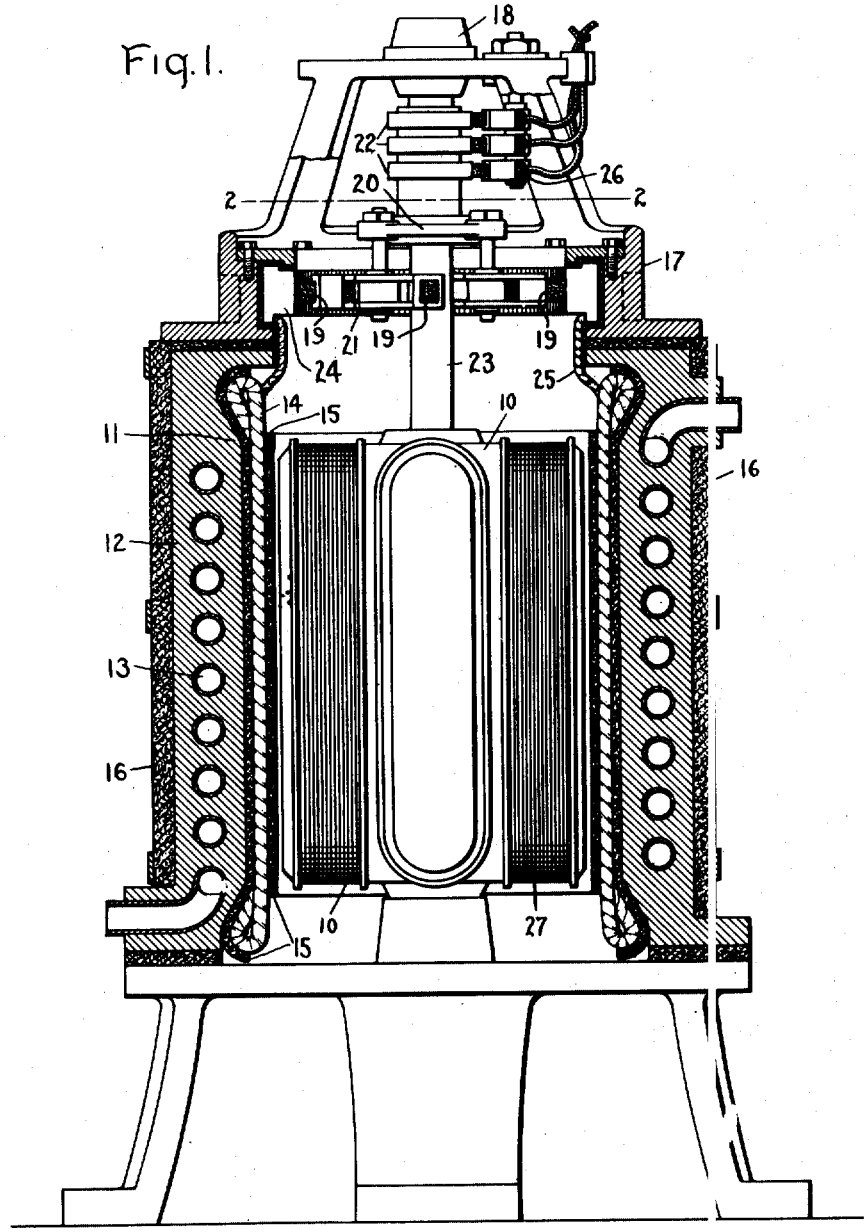

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC HEATER.

1,008,622.      Specification of Letters Patent.      Patented Nov. 14, 1911.

Application filed March 18, 1909. Serial No. 484,232.

*To all whom it may concern:*

Be it known that I, ELIHU THOMSON, a citizen of the United States, residing at Swampscott, in the county of Essex, State of Massachusetts, have invented certain new and useful Improvements in Electric Heaters, of which the following is a specification.

This invention relates to electric heaters and the like and has for its object the provision of a device of this character in which the energy of an electric circuit is transformed into heat by means of relatively moving parts, as for instance, by means of an electric motor or similar apparatus.

In the use of electric heaters difficulty has been experienced in the insulation of the conductor, if the heater is operated at a relatively high temperature. This is especially so where high voltages are used, say, for instance, 500 volts.

One of the objects of my invention, therefore, is to produce an electric heater which will run at a comparatively high temperature, the conditions being somewhat similar to those which exist in an electric locomotive.

In carrying out my invention I employ a device in which the heat is not generated in the copper conductors and the necessity for extra insulation of the conductors is thereby avoided. By the use of an electric motor operated at the greatest possible inefficiency, I am able to bring about this result. The motor is operated at high speed and the armature iron of the motor is short circuited, either by using a non-laminated core of good conductivity, as for instance, soft steel, or a material of high hysteresis may be used to increase the effect. I so construct the motor that the armature is stationary and a field rotates within the armature, though the reverse might be used, but would demand packed steam and water joints, a manifest disadvantage.

Passages are provided within the solid core of the armature, or in a mass in direct heat conductive relation therewith for the circulation of fluid to be heated, and a pump may be arranged to be driven in any desired manner to circulate the water through the passages except when the circulation would be automatic, as in some steam and hot water systems. The armature is preferably heat insulated from the field, so that no considerable heat is transmitted thereto and a heat insulation likewise covers the armature. The windings of the armature are preferably likewise heat insulated from the core to prevent them from being overheated. The commutator is best mounted so as to be independent of the core, so that all the heat which is developed is restricted to the core and to the water which is circulated to take it up for useful distribution. Other objects of my invention will appear in the course of the following specification, in which I have shown my invention embodied in concrete form for the purposes of illustration.

In the accompanying drawings, in which I have shown one form of my invention, Figure 1 represents a sectional elevation of my device; Fig. 2 represents a section on the line 2—2 of Fig. 1; Fig. 3 represents the arrangement of the motor in the heating system; and Figs. 4 and 5 are diagrams of the circuit connections of different types of motors.

Referring to the drawings, 10 represents the rotating member of the motor, which in this case is the field of the motor; 11 represents the annular armature surrounding the field. This armature consists of an annular core 12 having a spiral passage 13 inclosed therein, as for instance, a pipe cast in the core for the circulation of fluid to be heated. The armature is short circuited in any desired manner, as for instance, by making the core of solid iron or steel of comparatively good conductivity instead of laminating it, as is generally the case where the motors are to be run for ordinary purposes. The iron may be chosen as having a high hysteresis, in which case the conductivity is not so important. The armature has conductors 14 mounted on the inner face of the core, or within slots in such face and heat insulated both from the core and the rotatable field by means of an insulating material 15, such as asbestos or the like. The projecting ends of the winding need not be insulated for heat except from the armature iron. They can be exposed to air circulation. The core is likewise lagged on the outside with heat insulating material 16, so as to prevent the heat convection and radiation into the air. On the top of the core is mounted a bracket 17, which is provided at 18 with a bearing for the shaft of the rotating field. Brushes 19 are mounted on the collar 20 and are pressed into contact with the commutator by springs 21. Collector rings 22 are rigidly secured to the shaft 23 so as to rotate therewith. The commutator bars 24 are arranged to form a ring, as shown, on the inside of the bracket and are insulated from the bracket. The windings of the armature are connected to the commutator segments by conductors 25. Brushes 26 engage the rings 22 and are rigidly mounted on the bracket in any well known manner. The field of the motor has, as shown, four pole pieces, and the winding 27 is connected up as shown in the diagram in Fig. 4, but the machine may be bipolar or multipolar as desired.

The motor which has just been described is connected into the heating system in the manner shown in Fig. 3, by a pump 28 of any desired type, driven in any desired way, as for instance, by the motor itself, which causes the circulation of the fluid to be heated through the coils 13 and the core, or the circulation may be automatic in some cases. Radiators 29 may be connected as shown with the upper end of the circulating tube and may be for hot water or steam, dependent upon the conditions desired. A tank 30 is arranged to act as a hot well from which the pump takes its supply. In this way the fluid is kept in circulation through the core. Radiators may be arranged at various points throughout the car or other room which it is desired to heat.

In Fig. 4 I have shown the circuit connections. One of the three brushes 26, which is indicated by 26ª, is connected to the positive main through rheostat R; brush 26ᵇ is connected to the negative main, and the third brush, 26ᶜ, is connected directly to the positive main. The ring 19ª, engaged by brush 26ª, is connected to one set of commutator bars, while ring 19ᵇ, which is engaged by brush 26ᵇ, is connected with the other set of commutator bars. Ring 19ᶜ, which is engaged by brush 26ᶜ, is connected with the field circuit. By this arrangement it is possible to excite the field before throwing on the armature current, and a starting resistance at R may be used to start the motor.

In Fig. 5 I have shown a machine connected as a series machine, in which case it cannot run away from lack of load owing to the work done in the unlaminated hysteretic iron core of the armature. In this case but two slip rings are needed, 31 and 32, engaged by brushes 33 and 34, respectively. One end of the field winding is connected with the ring 31 while the other is connected with the ring 32. The brush 33 is connected with one of the commutator brushes 19 while the brush 34 is connected with one side of the line through the rheostat R, the other side of the line being connected with the other commutator brush 19.

It will be seen that I have provided an electric heater in which the electric conductors themselves are not used as the heating current. The core of the armature does the heating by reason of the eddy current and hysteresis loss therein. It should be understood, of course, that the arrangement that I have above disclosed is merely typical and may be varied without departing from the spirit of my invention, the scope of which is set forth in the annexed claims.

What I claim as new and desire to secure by Letters Patent of the United States, is—

1. An electric heater comprising a high speed electric motor having a rotating field magnet and a stationary armature consisting of a solid iron core having passages therethrough for the circulation of a fluid to be heated, and an armature winding on said core and heat insulated therefrom for producing rotation of said field magnet and thereby generating eddy currents to heat said core.

2. An electric heater comprising a high speed electric motor having a rotary field magnet and a stationary armature consisting of a short circuited iron core with passages therethrough for the circulation of a fluid to be heated, a winding on said core for producing rotation of said field magnet and thereby generating eddy currents to heat said core.

3. An electric heater comprising an armature consisting of suitable windings, a solid iron core having passages therethrough for the circulation of fluid to be heated surrounding said winding and heat insulated therefrom, heat insulation surrounding said core and a field winding rotatably mounted within said armature winding.

4. An electric heater comprising a rotary field winding, and a stationary armature consisting of a solid iron core having passages therethrough for the circulation of a fluid to be heated, and suitable windings heat insulated from the core.

5. An electric heater comprising a rotary field winding, and a stationary armature consisting of a solid iron core having passages therethrough for the circulation of a fluid to be heated, suitable windings heat insulated from the core, and heat insulation surrounding said core.

6. An electric heater comprising an armature consisting of suitable windings, a solid iron core surrounding said windings and heat insulated therefrom, heat insulation surrounding said core, and a field winding rotatably mounted within said armature winding.

7. An electric heater comprising an armature consisting of suitable windings, a solid iron core having passages therethrough for the circulation of fluid to be heated surrounding said winding and heat insulated therefrom, heat insulation surrounding said core, and a field winding rotatably mounted within said armature winding.

In witness whereof, I have hereunto set my hand this 16th day of March, 1909.

ELIHU THOMSON.

Witnesses:
ROBERT SHAND,
CHARLES A. BARNARD.